(No Model.)

S. R. WILMOT.
FRYING PAN.

No. 489,173. Patented Jan. 3, 1893.

WITNESSES
H. A. Laurel
Pearl M. Reynolds

INVENTOR
Samuel R. Wilmot
By F. M. Wooster atty

UNITED STATES PATENT OFFICE.

SAMUEL R. WILMOT, OF BRIDGEPORT, CONNECTICUT, ASSIGNOR TO THE WILMOT & HOBBS MANUFACTURING COMPANY, OF SAME PLACE.

FRYING-PAN.

SPECIFICATION forming part of Letters Patent No. 489,173, dated January 3, 1893.

Application filed September 30, 1892. Serial No. 447,405. (No model.)

*To all whom it may concern:*

Be it known that I, SAMUEL R. WILMOT, a citizen of the United States, residing at Bridgeport, in the county of Fairfield and State of Connecticut, have invented certain new and useful Improvements in Frying-Pans; and I do hereby declare the following to be a full, clear, and exact description of the invention, such as will enable others skilled in the art to which it appertains to make and use the same.

My invention has for its object the production of a frying pan the lid of which shall be controlled entirely by movement of the bail or handle, and which shall be so constructed that the lid may be locked in the raised position by movement of the handle only and when the lid is in this position the pan may be tilted by the handle and without touching it with the hand.

Figure 1:
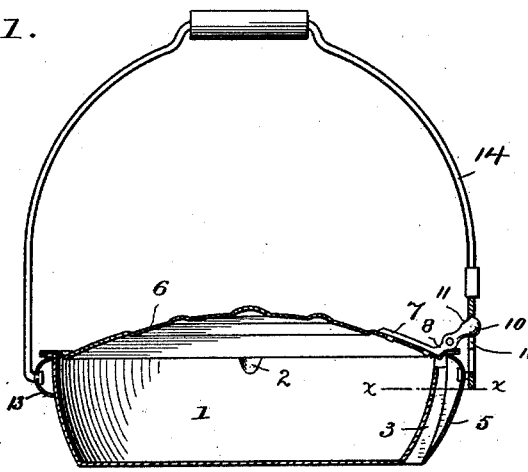
Figure 5:
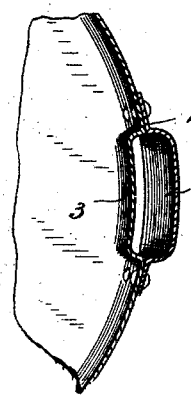
Figure 6:
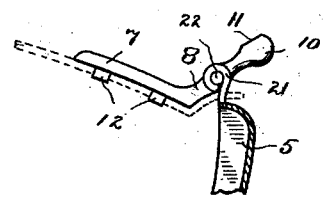
Figure 2:
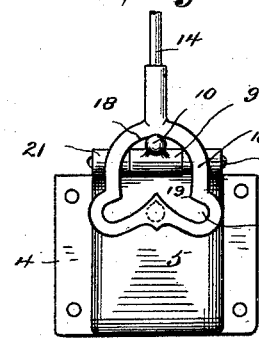
Figure 3:
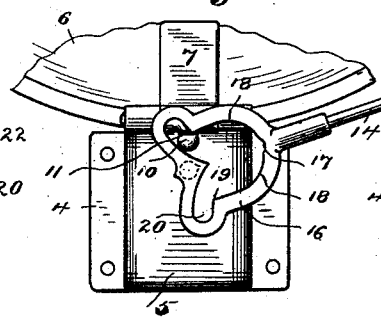
Figure 4:
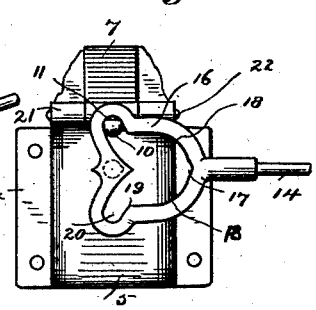
Figure 7:
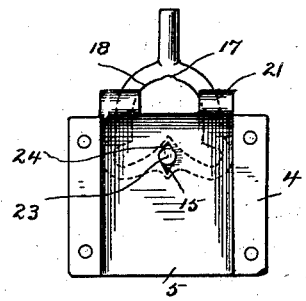

With these ends in view I have devised the simple and novel construction which I will now describe referring by numbers to the accompanying drawings forming part of this specification in which:

Figure 1 is a section of my novel frying pan the handle being in the raised position and the lid in the lowered position. Fig. 2 an end elevation on an enlarged scale of the lid lifting mechanism the position being the same as in Fig. 1. Fig. 3 a similar view showing the position of the parts when the lid is lifted to its highest position, which is nearly vertical. Fig. 4 a similar view the bail or handle having been swung still farther downward and the lid having dropped slightly to the locked position. Fig. 5 a section on the line *x x* in Fig. 1. Fig. 6 a detail view partly in section showing the connection of the lid to the arm, and of the arm to the pan, and Fig. 7 is an elevation corresponding with Fig. 2 the point of view being opposite to that in Fig. 2 and the arm being removed.

1 denotes the pan which in practice is formed from a blank of sheet metal and is provided on opposite sides with spouts 2 only one being shown in the drawings. Upon one side of the pan at right angles to the spouts, is a depression 3 extending from top to bottom which forms the inner side of an odor tube, the outer side of the odor tube being formed by a plate 4 which is riveted to the pan and is provided with a depression 5, said depression 5 curving outward from the pan and forming the outer side of the odor tube and serving also as a point of attachment for one end of the bail or handle as will be more fully explained.

6 denotes the lid which covers the top of the pan and also the spouts.

7 denotes a plate which is provided with an arm 8 extending at an angle thereto, said arm comprising an eye 9 and a head 10 having a flattened surface 11 the purpose of which will presently be explained. The plate, arm, eye and head are made of malleable iron and are cast in a single piece. On the under-side of the plate are cast lugs 12 by which the plate is attached to the lid, the lugs being passed through openings in the lid their inner ends split and then headed down. On the outer side of the pan opposite to the odor tube is riveted an outwardly curved plate 13 which serves as a point of attachment for one end of the bail or handle 14, the connection being made by curving the end of the bail inward, passing it through an opening in the plate and bending the extreme end at an angle to the end of the curved portion, or heading it down as may be preferred. At the center of plate 4 and directly opposite to the opening in plate 13 is an opening 15 which is elongated downward. At the end of the bail opposite to that attached to plate 13 is a plate 16, the inner portion of which is removed leaving inner cam surfaces which are engaged by head 10. The two cam surfaces are exactly alike so that the bail may be swung in either direction, as most convenient, to raise the lid. The two cam surfaces meet at the top of plate 16, the intersection of these surfaces being indicated by 17. When the head lies at this intersection of the cam surfaces the bail is held at the raised position and the lid is at the lowered position resting upon the top of the pan. When the bail is swung downward in either direction head 10 will ride along a concave curve 18. As the lower ends of these curves are much nearer the center of oscillation of the bail than the intersection it follows that as the bail is swung downward the lid will be lifted until the extreme end of the curved surface is reached, said surfaces terminating in slight projections 19 which ride along flattened surface 11 of the head thereby retaining the lid at its highest position if the movement of the bail is stopped, this position of the parts being clearly indicated in Fig. 3. If the downward movement of the bail is continued the lid drops downward slightly and the head swings upward into a depression 20 as clearly shown in Fig. 4. In this position the bail and lid are locked together the lid being locked in the raised position. The bail now lies at its lowest position entirely outside of the pan so that the operator may tilt the pan by means of the bail without danger of the bail or lid slipping and without danger of burning the hand with steam. In order to lower the lid from this position it is necessary to lift the lid independently of the bail from the position shown in Fig. 4 to that shown in Fig. 3, the bail may then be swung to its raised position as shown in Fig. 2 and the lid will move down to its lowered position as is clearly shown in Fig. 1.

It will be noticed in Fig. 1 that the top of depression 3 is lower than the rim of the pan. This is in order to leave a passage for steam from the interior of the pan when the lid is down, into the odor tube. It will be noticed furthermore that the top of plate 4 is curved over the top of the odor tube so as to close it.

21 denotes eyes formed from the metal of plate 4 at the upper end thereof. These eyes lie on opposite sides of eye 9 and register therewith.

The cover is secured to the pan by means of a pin 22 driven through the eyes. As already stated opening 15 in plate 4 is elongated downward. On the inner side of plate 16 is a lug 23 provided with a teat 24 which is adapted to pass through opening 15 when the bail is swung downward under the pan, this position not being shown as it is not deemed necessary, lug 23 and the teat being clearly shown in Fig. 7 and their position being indicated by a dotted line in Figs. 2, 3 and 4. It will be seen that in any position in which the bail can be placed after the parts are once assembled it will be impossible to make the teat register with elongated opening 15 so that it will be impossible to detach the bail without removing plate 4 from the pan. It should be noted that by connecting one end of the bail to plate 4 forming the outer side of the odor tube I insure that the pan shall be perfectly balanced when the bail is in the raised position.

Having thus described my invention I claim:

1. The combination with the pan and a lid hinged thereto and provided on the hinged side with an arm, of a bail pivoted to swing in a plane at right angles to the plane of movement of the lid and having at one end a plate provided with a cam surface adapted to be engaged by the arm so that when the bail is swung downward the lid is raised and when the bail is swung upward the lid moves down to its lowered position, the pan and lid being at all times perfectly balanced on the bail.

2. The combination with a pan and a lid hinged thereto and provided on the hinged side with an arm, of a bail having at one end a plate provided with cam surfaces for the purpose set forth which intersect at the top of the plate said surfaces curving downward and inward toward the center of oscillation of the bail so that when the bail is swung downward in either direction the lid is raised, and when the bail is at its raised position the arm will lie in the intersection and the lid will rest upon the pan.

3. The combination with a pan and a lid hinged thereto, and provided on the hinged side with an arm having a head 10, of a bail having at one end a plate provided with cam surfaces which intersect at the top, curve downward and inward and terminate in projections 19, and depressions 20 below the projections so that in its raised position head 10 will lie at the intersection of the cam surfaces and when the bail is swung downward in either direction the lid will be raised until the head is engaged by projections 19, and further downward movement of the bail will cause the head to engage one of the depressions, in which position both bail and lid are locked and the pan may be tilted by the bail.

4. The combination with a pan and a lid hinged thereto and provided on the hinged side with an arm having a head 10 with a flattened surface 11, of a bail having at one end a plate provided with cam surfaces which intersect at the top, curve downward and inward and terminate in projections 19 adapted to engage surface 11, and depressions 20 below the projections adapted to receive the head substantially as described.

5. The combination with a pan having a depression 3, and a plate 4 having a depression 5, said plate being riveted to the pan and the depression forming an odor tube, of a lid hinged to plate 4 and having an arm extending therefrom, and a bail having at one end a plate provided with cam surfaces substantially as described and shown which are engaged by the arm whereby the lid may be raised and locked in the raised position.

6. The combination with a pan having a plate 4 riveted thereto and provided with a depression 5 and eyes 21, of a lid having an arm extending therefrom and provided with an eye 9, a pin extending through the eyes by which the lid is connected to plate 4, and a bail having at one end a plate provided with cam surfaces adapted to be engaged by the arm as and for the purpose set forth.

7. The combination with a pan having a plate 4 riveted thereto, said plate having a depression 5 provided with an elongated opening 15, of a lid having an arm extending therefrom, and a bail having at one end a plate provided with cam surfaces adapted to be engaged by the arm for the purpose set forth, and on its inner side a lug 23 having a teat 24 adapted to engage opening 15 in one position only whereby the bail is attached to the plate.

In testimony whereof I affix my signature in presence of two witnesses.

SAMUEL R. WILMOT.

Witnesses:
A. M. WOOSTER,
PEARL M. REYNOLDS.